United States Patent
Song et al.

(10) Patent No.: US 8,236,401 B2
(45) Date of Patent: Aug. 7, 2012

(54) VACUUM INSULATOR

(75) Inventors: Tae-Ho Song, Daejeon (KR); Haeyong Jung, Daejeon (KR); Jae-Sung Kwon, Daejeon (KR); Choong Hyo Jang, Daejeon (KR); Jongmin Kim, Daejeon (KR)

(73) Assignee: Korea Advanced Institute of Science and Technology, Daejeon (KR)

( * ) Notice: Subject to any disclaimer, the term of this patent is extended or adjusted under 35 U.S.C. 154(b) by 0 days.

(21) Appl. No.: 13/323,125

(22) Filed: Dec. 12, 2011

(65) Prior Publication Data

US 2012/0148786 A1 Jun. 14, 2012

Related U.S. Application Data

(62) Division of application No. 12/709,174, filed on Feb. 19, 2010.

(30) Foreign Application Priority Data

May 4, 2009 (KR) .................. 10-2009-0038857
Oct. 20, 2009 (KR) .................. 10-2009-0099659

(51) Int. Cl.
*F16L 59/065* (2006.01)
(52) U.S. Cl. ........................................ 428/69
(58) Field of Classification Search .......... 428/69
See application file for complete search history.

(56) References Cited

FOREIGN PATENT DOCUMENTS

| JP | 05-079592 A | 3/1993 |
|---|---|---|
| JP | 2009-052680 A | 3/2009 |
| KR | 10-1998-078092 | 11/1998 |

OTHER PUBLICATIONS

J. Brandrup et al., "Polymer Handbook-Permeability and Diffusion Data 4th ed.", Thesis, 1999, pp. VI.545-560, Wiley, New York.
Korean Office Action of the corresponding Korean Application No. 10-2009-0099659, dated Jul. 19, 2011.

*Primary Examiner* — Alexander Thomas
(74) *Attorney, Agent, or Firm* — Global IP Counselors, LLP

(57) ABSTRACT

The vacuum insulator includes an internal structure; a filler for filling empty spaces of the internal structure; and an envelope having an upper envelope composed of a metal layer and a polymer layer formed on the metal layer to surround an upper surface of the internal structure, and a lower envelope composed of a metal layer and a polymer layer formed on the metal layer to surround a lower surface of the internal structure, wherein the metal layer of the upper envelope and the metal layer of the lower envelope being opposite to each other, wherein at an area facing the internal structure in an end of the envelope, the upper envelope and the lower envelope are adhered by a heat adhesion part, and at an area opposite to the internal structure in the end of the envelope, the upper envelope and the lower envelope are adhered by polyurethane.

3 Claims, 11 Drawing Sheets

-Prior Art-

-Prior Art-

-Prior Art-

VACUUM INSULATOR

CROSS-REFERENCE TO RELATED APPLICATIONS

This U.S. National stage application is a divisional application of U.S. patent application Ser. No. 12/709,174 filed Feb. 19, 2010 claims priority under 35 U.S.C. §119(a) to Korean Patent Application No. 10-2009-0038857, filed in the Republic of Korea on May 4, 2009, and Korean Patent Application No. 10-2009-0099659, filed in the Republic of Korea on Oct. 20, 2009, the entire contents of which are hereby incorporated herein by reference.

BACKGROUND OF THE INVENTION

1. Field of the Invention

The present invention relates to a vacuum insulator for being used as insulating material for a building or a refrigerator, etc.

2. Background Information

Half of total energy amount consumed by human being is for heating/cooling houses and commercial buildings, and this rate is same as domestic rate. Considering the fact that supply amount of alternative energy is only 1 to 2% of total energy consumption amount and supply amount for alternative energy is not above 10% even in a long term plan, reducing energy for heating/cooling is the most effective way to overcome this present energy crisis. The reason why much energy is consumed for heating/cooling is that heat conduction coefficient of conventional insulators still stays at threshold value of 30 mW/m·K for a last century. An idea for reducing energy consumption to half with the conventional insulating materials is to control the thickness of the insulating materials. However, in this idea, thickness of insulating materials is too thick to build economic buildings, and it inevitably requires breaking down conventional buildings.

Accordingly, a vacuum insulator has been developed as an ultra insulator capable of being used as interior and exterior materials of conventional and new buildings. The vacuum insulator is composed of a porous filler and an isolation envelope for surrounding the filler. Since the vacuum insulator removes gas in the envelope and keeps vacuum state in the envelope for a few years, the vacuum insulator can have a very low heat conduction rate. Since the vacuum insulator has a 10 to 100 times insulating efficiency compared to conventional insulating materials, the insulating effect can be increased by using the vacuum insulator. Since the thickness of the insulator compared to conventional insulating materials is decreased, utilization of internal space can be improved. In addition, since the inside of the vacuum insulator is kept vacuum, the convective heat conduction in the inside can be prevented. Here, the vacuum level in the vacuum insulator causes remarkable difference in vacuum efficiency, and thus it is important to keep the vacuum level in the vacuum insulator. Factors of increasing internal pressure and affecting the vacuum level in the vacuum insulator are gas escape from an internal structure, air infiltration from the envelope, and air infiltration through the envelope surface or the envelope adhesion part. The most influential one of those factors is the air infiltration through the envelope adhesion part.

In the conventional method, in order to prevent air infiltration through the envelope adhesion part, the adhesion part is adhered by heat with Low density polyethylene LDPE film and a Linear low density polyethylene LLDPE film having a high permeability.

FIG. 1 is a schematic diagram for showing a structure of a vacuum insulator according to the conventional technique.

As shown in FIG. 1, the vacuum insulator according to the conventional technique comprises an envelope 10, an internal structure 30 and a filler 40. The adhesion part 20 of four edges parts in which a Low density polyethylene film LDPE, an aluminium film, a Linear low density polyethylene LLDPE film are stacked, is adhered by heat. This envelope 10 prevents air infiltration from the outside.

FIG. 2a and FIG. 2b are cross sectional views of showing structures of the envelope of the vacuum insulator according to the conventional technique.

FIG. 2a is a cross sectional view of showing a structure of the envelope at an area cut along B-B of FIG. 1, and FIG. 2b is a cross sectional view of showing the structure of the envelope at an area cut along A-A of FIG. 1. Here, FIG. 2a is a cross sectional view of the envelope 10 of FIG. 1, and FIG. 2b is a cross sectional view of the adhesion part 20 of FIG. 1.

As shown in FIG. 2a, the envelope of a single film according to the conventional technique is composed of a Polyethylene terephthalate film PET 11, a Low density polyethylene film LDPE 12, an aluminium film 13, and a Low density polyethylene film LDPE 14 and a Linear low density polyethylene film LLDPE 15. Here, since the aluminium film at the middle of the envelope has a low permeability, air permeation from the outside through the envelope surface can be prevented.

As shown in FIG. 2b, in the adhesion part 20 where two envelops are adhered, the envelope of a single film composed of a Polyethylene terephthalate film PET 11a, a Low density polyethylene film LDPE 12a, an aluminium film 13a, and a Low density polyethylene film LDPE 14a and a Linear low density polyethylene film LLDPE 15a is adhered with another single layer envelope composed of a Linear low density polyethylene film LLDPE 15b, a Low density polyethylene film LDPE 14b, an aluminium film 13b, a Low density polyethylene film LDPE 12b and a Polyethylene terephthalate film PET 11b.

Here, the two envelopes are adhered by heat the Low density polyethylene film LDPE 14a, 14b and the Linear low density polyethylene film LLDPE 15a, 15b. However, the Low density polyethylene film LDPE 14a, 14b and the Linear low density polyethylene film LLDPE 15a, 15b have a problem of making air infiltration easy through the adhesion part because of its high air permeability.

In addition, since vacuum level in the vacuum insulator is not kept due to the reasons, insulating efficiency can be reduced remarkably. In addition, since insulating efficiency of the vacuum insulator is reduced remarkably, the vacuum insulator can not perform its role.

SUMMARY OF THE INVENTION

The present invention is conceived to solve the aforementioned problems. Accordingly, the present invention provides a vacuum insulator, in which air infiltration through an adhesion part of the envelope can be reduced and vacuum maintenance performance can be improved, compared to a conventional case of adhering the envelope by a heat, by adhering a metal layer of an upper envelope and a metal layer of a lower envelope by polyurethane.

In addition, the present invention provides a vacuum insulator, in which air infiltration from the outside through a surface of the envelope can be prevented effectively and the adhesion by urethane can be easy, by using the envelope comprising a metal layer.

In addition, the present invention provides a vacuum insulator, in which vacuum maintenance performance of the vacuum insulator can be improved, by adhering the metal layer of the upper envelope and the metal layer of the lower envelope by heat between which a film composed of the LDPE and the LLDPE is inserted, only in a certain area along outlines of the upper envelope and the lower envelope.

In addition, the present invention provides a vacuum insulator, in which any additional shield against radiation is not necessary to be installed and the manufacture process can be easy and convenient, by the metal layer having a high reflection rate and performing as a shield against radiation, in the lowest layer of the envelope.

In addition, the present invention provides a vacuum insulator, by which gaps made of the heat adhesion part between the metal layers and the metal layer can be decreased, and air infiltration through the end of the envelope which is a factor affecting the vacuum level by increasing internal pressure thereof can be reduced, and reduction of the insulating efficiency can be prevented by keeping a vacuum level of the vacuum insulator, by inserting a metal layer to a heat adhesion part for adhering ends of the envelopes by heat.

In addition, the present invention also provides a vacuum insulator, by which air infiltration through the end of the envelope which is a factor affecting the vacuum level by increasing internal pressure thereof can be reduced, and reduction of the insulating efficiency can be prevented by keeping a vacuum level of the vacuum insulator, by adhering an area facing the internal structure in an end of the envelope of the vacuum insulator by a heat adhesion part, and adhering a area opposite to the internal structure by a polyurethane.

In addition, the present invention provides a vacuum insulator, by which gaps made of the heat adhesion part between the metal layers and the metal layer can be decreased at an area facing the internal structure, and the metal layers can be adhered with very thin thickness at an area opposite to the internal structure, and air infiltration through the end of the envelope which is a factor affecting the vacuum level by increasing internal pressure thereof can be reduced, and reduction of the insulating efficiency can be prevented by keeping a vacuum level of the vacuum insulator, by adhering an area facing the internal structure in an end of the envelope of the vacuum insulator by a heat adhesion part, and adhering a area opposite to the internal structure by a polyurethane, and inserting a metal layer to a adhesion part.

A vacuum insulator includes: an internal structure; a filler for filling empty spaces of the internal structure; and an envelope having an upper envelope composed of a metal layer and a polymer layer formed on the metal layer to surround an upper surface of the internal structure, and a lower envelope formed of a metal layer and a polymer layer formed on the metal layer to surround a lower surface of the internal structure, wherein the metal layer of the upper envelope and the metal layer of the lower envelope are opposite to each other, wherein in a certain area along outlines of the upper envelope and the lower envelope, the metal layer of the upper envelope and the metal layer of the lower envelope are adhered by polyurethane, and in an area excluding the certain area, the metal layer of the upper envelope and the metal layer of the lower envelope between which a film composed of a Low density polyethylene LDPE and a LinearLow density polyethylene LLDPE is inserted, are adhered by heat.

Consequently, since the metal layer of the upper envelope and the metal layer of the lower envelope are adhered by polyurethane, and air infiltration through the adhesion part can be reduced and vacuum maintenance performance can be improved, compared to a conventional case of adhering the envelope by a heat. In addition, since the envelope includes the metal layer, air infiltration from the outside through the surface of the envelope can be prevented efficiently and an adhesion can be easily performed by urethane. In addition, since only in an area excluding the certain area, the metal layer of the upper envelope and the metal layer of the lower envelope between which the film composed of the LDPE and the LLDPE is inserted, are adhered by heat, the vacuum maintenance performance of the vacuum insulator can be improved.

The vacuum insulator is the vacuum insulator as set forth in claim 1 wherein the polymer layer is formed by stacking at least one of polymer films.

Consequently, since the polymer layer is formed by stacking at least one of polymer films, the lower metal layer can be protected from breakage and air infiltration into the envelope can be effectively prevented.

A vacuum insulator includes: an internal structure; a filler for filling empty spaces of the internal structure; and an envelope having an upper envelope composed of a metal layer and a polymer layer formed on the metal layer to surround an upper surface of the internal structure, and a lower envelope composed of a metal layer and a polymer layer formed on the metal layer to surround a lower surface of the internal structure, wherein the metal layer of the upper envelope and the metal layer of the lower envelope are opposite to each other, and the upper envelope and the lower envelope are adhered by a heat adhesion part at an end of the envelope, and a metal layer is inserted to the heat adhesion part in order to reduce air infiltration through the heat adhesion part.

Consequently, since a metal layer is inserted to a heat adhesion part for adhering ends of the envelopes by heat, gaps made of the heat adhesion part between the metal layers and the metal layer can be decreased, and air infiltration through the end of the envelope which is a factor affecting the vacuum level by increasing internal pressure thereof can be reduced, and reduction of the insulating efficiency can be prevented by keeping a vacuum level of the vacuum insulator.

A vacuum insulator includes: an internal structure; a filler for filling empty spaces of the internal structure; and an envelope having an upper envelope composed of a metal layer and a polymer layer formed on the metal layer to surround an upper surface of the internal structure, and a lower envelope composed of a metal layer and a polymer layer formed on the metal layer to surround a lower surface of the internal structure, wherein the metal layer of the upper envelope and the metal layer of the lower envelope are opposite to each other, wherein at an area facing the internal structure in an end of the envelope, the upper envelope and the lower envelope are adhered by a heat adhesion part, and at a area opposite to the internal structure in the end of the envelope the upper envelope and the lower envelope are adhered by polyurethane.

Consequently, since an area facing the internal structure in an end of the envelope of the vacuum insulator is adhered by a heat adhesion part, and a area opposite to the internal structure is adhered by a polyurethane, air infiltration through the end of the envelope which is a factor affecting the vacuum level by increasing internal pressure thereof can be reduced, and reduction of the insulating efficiency can be prevented by keeping a vacuum level of the vacuum insulator.

A vacuum insulator includes: an internal structure; a filler for filling empty spaces of the internal structure; and an envelope having an upper envelope composed of a metal layer and a polymer layer formed on the metal layer to surround an upper surface of the internal structure, and a lower envelope composed of a metal layer and a polymer layer formed on the metal layer to surround a lower surface of the internal structure, wherein the metal layer of the upper envelope and the metal layer of the lower envelope are opposite to each other, wherein at an area facing the internal structure in an end of the envelope, the upper envelope and the lower envelope are adhered by a heat adhesion part, and at a area opposite to the internal structure in the end of the envelope, the upper envelope and the lower envelope are adhered by polyurethane, and a metal layer is inserted to the heat adhesion part in order to reduce air infiltration through the heat adhesion part.

Consequently, since an area facing the internal structure in an end of the envelope of the vacuum insulator is adhered by a heat adhesion part, and an area opposite to the internal structure is adhered by a polyurethane, and a metal layer is inserted to a adhesion part, gaps made of the heat adhesion part between the metal layers and the metal layer can be decreased at an area facing the internal structure, and the metal layers can be adhered with very thin thickness at an area opposite to the internal structure, and air infiltration through the end of the envelope which is a factor affecting the vacuum level by increasing internal pressure thereof can be reduced, and reduction of the insulating efficiency can be prevented by keeping a vacuum level of the vacuum insulator.

According to the present invention configured as described above, since a metal layer of an upper envelope and a metal layer of a lower envelope are adhered by polyurethane, air infiltration through an adhesion part of the envelope can be reduced and vacuum maintenance performance can be improved, compared to a conventional case of adhering the envelope by a heat.

According to the present invention, since the envelope comprises a metal layer, air infiltration from the outside through a surface of the envelope can be prevented effectively and the adhesion by urethane can be easy.

According to the present invention, since the metal layer of the upper envelope and the metal layer of the lower envelope by heat between which a film composed of the LDPE and the LLDPE is inserted, are adhered, vacuum maintenance performance of the vacuum insulator can be improved.

According to the present invention, since the metal layer having a high reflection rate, performs as a shield against radiation, in the lowest layer of the envelope, any additional shield against radiation is not necessary to be installed and the manufacture process can be easy and convenient.

According to the present invention, since a metal layer is inserted to a heat adhesion part for adhering ends of the envelopes by heat, gaps made of the heat adhesion part between the metal layers and the metal layer can be decreased, and air infiltration through the end of the envelope which is a factor affecting the vacuum level by increasing internal pressure thereof can be reduced, and reduction of the insulating efficiency can be prevented by keeping a vacuum level of the vacuum insulator.

According to the present invention, since an area facing the internal structure in an end of the envelope of the vacuum insulator is adhered by a heat adhesion part, and an area opposite to the internal structure is adhered by a polyurethane, an area facing the internal structure can be adhered by adhesion part, and an area opposite to the internal structure can be adhered by a polyurethane with very thin thickness, air infiltration through the end of the envelope which is a factor affecting the vacuum level by increasing internal pressure thereof can be reduced, and reduction of the insulating efficiency can be prevented by keeping a vacuum level of the vacuum insulator.

According to the present invention, since an area facing the internal structure in an end of the envelope of the vacuum insulator is adhered by a heat adhesion part, and an area opposite to the internal structure is adhered by a polyurethane, and a metal layer is inserted to a adhesion part, gaps made of the heat adhesion part between the metal layers and the metal layer can be decreased at an area facing the internal structure, and the metal layers can be adhered with very thin thickness at an area opposite to the internal structure, and air infiltration through the end of the envelope which is a factor affecting the vacuum level by increasing internal pressure thereof can be reduced, and reduction of the insulating efficiency can be prevented by keeping a vacuum level of the vacuum insulator.

The objects, constructions and effects of the present invention are included in the following embodiments and drawings. The advantages, features, and achieving methods of the present invention will be more apparent from the following detailed description in conjunction with embodiments and the accompanying drawings. The same reference numerals are used throughout the drawings to refer to the same or like parts.

BRIEF DESCRIPTION OF THE DRAWINGS

The above and other features and advantages of the present invention will become more apparent to those of ordinary skill in the art by describing in detail preferred embodiments thereof with reference to the attached drawings, in which.

DETAILED DESCRIPTION OF THE PREFERRED EMBODIMENTS

Above all, a theoretical background relating to the present invention is described in detail.

First Embodiment

Figure 1:
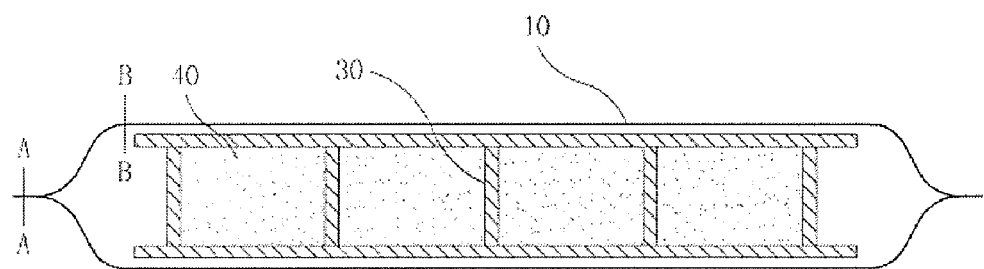
FIG. 1 is a schematic diagram for showing the structure of the vacuum insulator relating to the conventional technique.
Figure 2A:
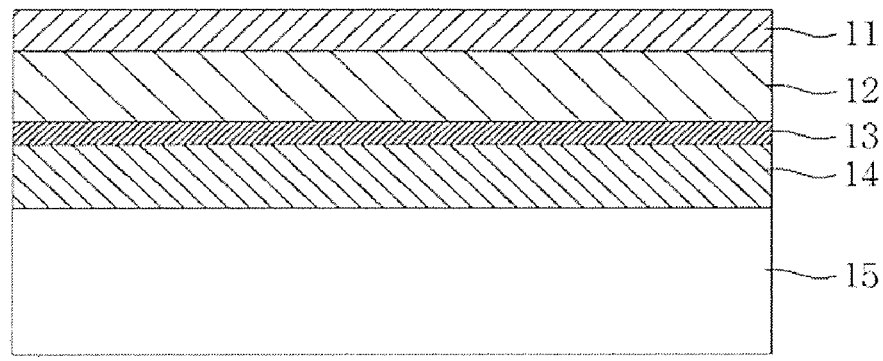
FIG. 2a is a cross sectional view of showing the structure of the envelope at an area cut along B-B of FIG. 1.
Figure 2B:
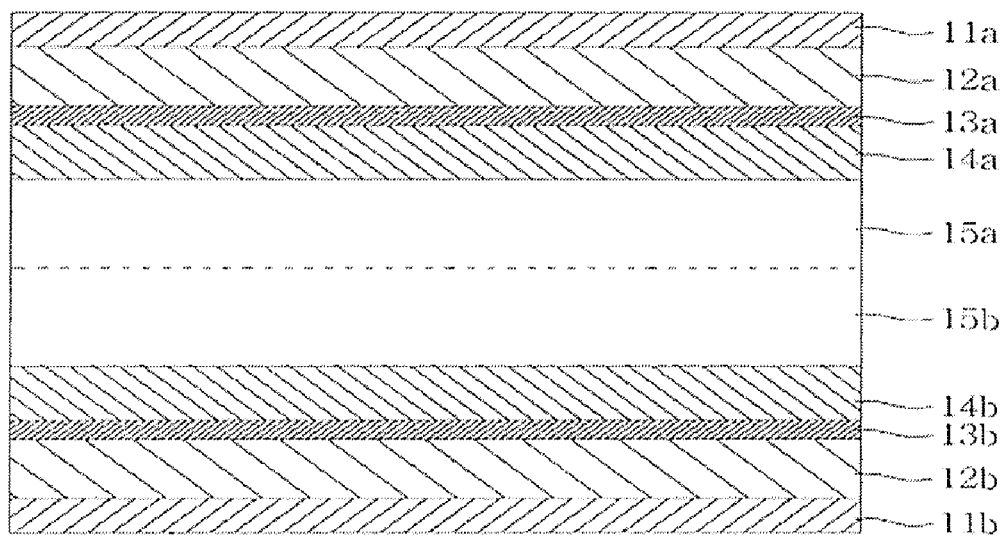
FIG. 2b is a cross sectional view of showing the structure of the envelope at an area cut along A-A of FIG. 1.
Figure 3:
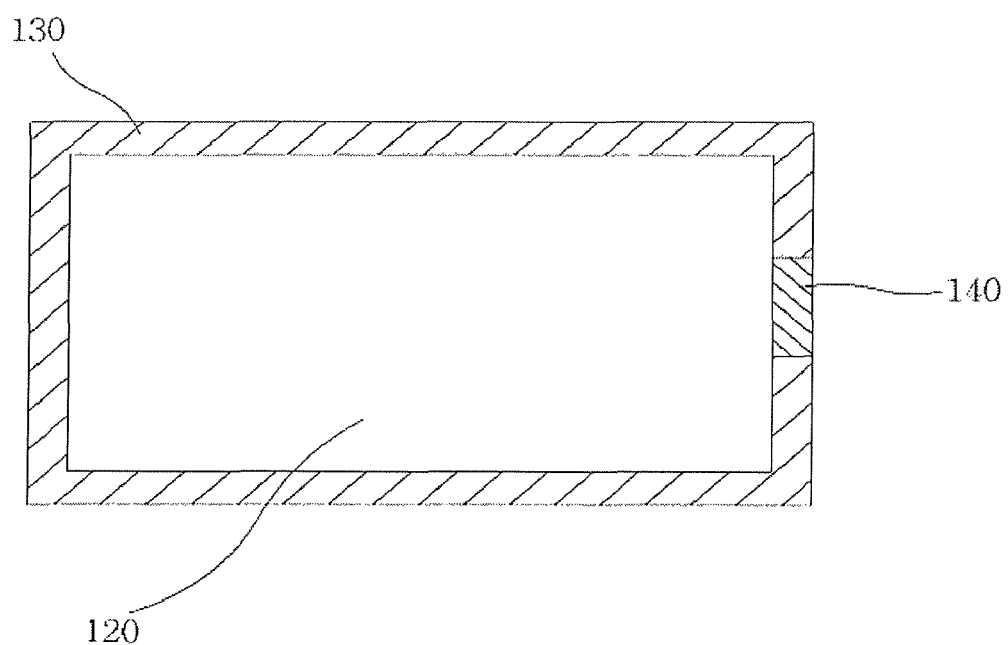
FIG. 3 is a top view for showing the structure of the vacuum insulator according to a first embodiment of the present invention.
Figure 4:
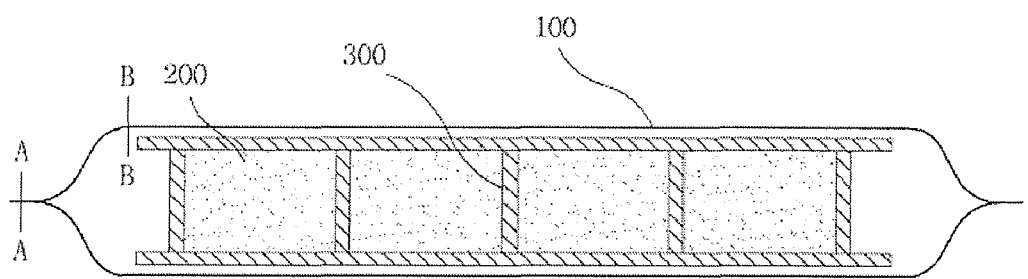
FIG. 4 is a cross sectional view of showing an internal structure of the vacuum insulator according to the first embodiment of the present invention.

FIG. 3 is a top view for showing the structure of the vacuum insulator according to a first embodiment of the present invention. FIG. 4 is a cross sectional view of showing an internal structure of the vacuum insulator according to the first embodiment of the present invention.

As shown in FIGS. 3 and 4, the vacuum insulator of the first embodiment of the present invention includes an internal structure 300, a filler 200 for filling spaces of the internal structure 300, and an envelope 100 for surrounding the internal structure 200.

The internal structure 300 is designed to have minimal heat transmission to endure the atmospheric pressure. In addition, the internal structure 300 is preferably formed of material having high ratio of a tensile strength to heat conduction coefficient. For example, polymer is used as a result of considering tensile strength, heat conduction rate and manufacture factors. More specifically, Polycarbonate or Polyimide is preferably used among polymers, which has high ratio of a tensile strength to heat conduction coefficient.

The filler 200 is a material for filling empty spaces of the internal structure 300 to keep efficiency of the vacuum insulator even in a low vacuum level. The smaller the filler 200 is, the better the performance of the filler 200 is. In addition, the filler 200 is a porous filler for reducing heat conduction by gas, and may be made of silica powder, pearlite powder, glass fiber, wool and aerogel, etc.

The envelope 100 has an upper envelope and a lower envelope. The envelope 100 is for preventing air infiltration from the outside, and it is preferable to use a film made of material keeping vacuum state for a long time. The envelope is composed of a metal layer and a polymer layer. The polymer layer is formed by stacking at least one of polymer films.

As shown in FIG. 3, in view of the upper side of the vacuum insulator according to the first embodiment, an envelope 120 includes an adhesion part 130 and a heat adhesion part 140 along an outline of the envelope 120.

The adhesion part 130 is a certain area along outlines of the upper envelope the upper envelope and the lower envelope. In the certain area along outlines of the upper envelope and the lower envelope, the metal layer of the upper envelope and the metal layer of the lower envelope are adhered by polyurethane of low permeability.

The heat adhesion part 140 is an area excluding the certain area along outlines of the upper envelope the upper envelope and the lower envelope. In the area excluding the certain area, the metal layer of the upper envelope and the metal layer of the lower envelope between which a film (refer to a following description of FIG. 6) of high permeation composed of a Low density polyethylene LDPE and a LinearLow density polyethylene LLDPE is inserted, are adhered by heat.

The vacuum insulator is formed in a pouch shape by adhering the metal layers of the certain area by Urethane. Then, air in the envelope 120 is discharged through the heat adhesion part 140, and the heat adhesion part 140 is adhered by heat. Here, a reason for adhering only the heat adhesion part 140 by heat is that, in case of using Urethane, it takes a lot of time (about 24 hours) to dry Urethane, and thus it is difficult to keep vacuum state in the vacuum insulator. Accordingly, in the vacuum insulator according to the present invention, since only the heat adhesion part 140 is rapidly adhered by heat, the vacuum state inside the vacuum insulator can be easily kept.

Figure 5:
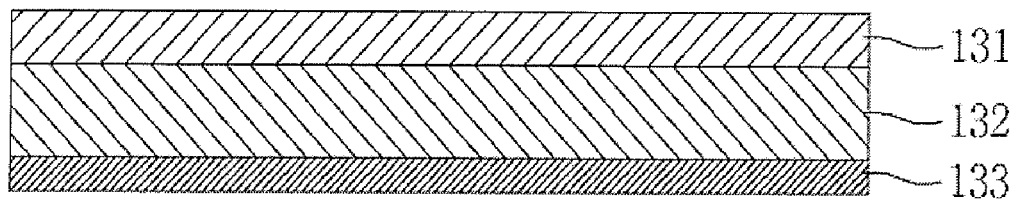
FIG. 5 is a cross sectional view of the envelope of the vacuum insulator according to the first embodiment of the present invention (along B-B in FIG. 4)
Figure 6:
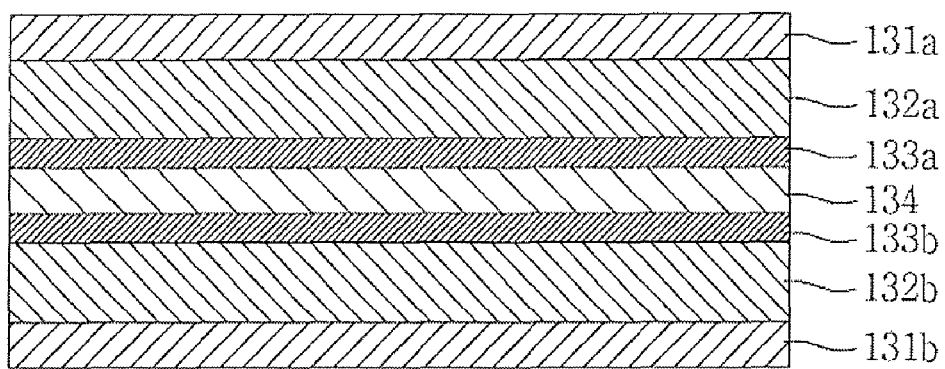
FIG. 6 is a cross sectional view of the envelope of the vacuum insulator according to the first embodiment of the present invention (along A-A in FIG. 4)

FIG. 5 is a cross sectional view of the envelope of the vacuum insulator according to the first embodiment of the present invention (along B-B in FIG. 4), and FIG. 6 is a cross sectional view of the envelope of the vacuum insulator according to the first embodiment of the present invention (along A-A in FIG. 4). FIG. 5 is a cross sectional view of the envelope 130 of FIG. 3, and FIG. 6 is a cross sectional view of the junction part 140 of FIG. 3. Since the envelope for the vacuum insulator covers an external side of the vacuum insulator to reduce air infiltration into the vacuum insulator, vacuum state thereof can be kept. Specific structure of the envelope will be described with respect to FIG. 5 and FIG. 6. Meanwhile, in FIG. 5 and FIG. 6, there is at least one of polymer films forming a polymer layer of the envelope for the vacuum insulator, and a polyethylene terephthalate film and a low density polyethylene film will be described as an example.

As shown in FIG. 5, the envelope for the vacuum insulator according to the first embodiment of the present invention is composed of a polymer layer 131, 132 and a metal layer 133.

The polymer layer 131, 132 is formed by stacking at least one of polymer films. For example, the polymer layer 131, 132 formed by stacking a polyethylene terephthalate film 131 and a low density polyethylene film 132. In the present invention, the polymer layer 131,132 is formed by stacking the PET Polyethylene terephthalate film 131 and the LDPE Low density polyethylene 132 as an example, and however the polymer layer 131, 132 may be formed by stacking a polymer film such as LLDPE Linear-Low density polyethylene film in addition to the PET film 131 and the LDPE film 132. Also, the polymer layer 131, 132 may be composed of the other polymer film except for PET film, the LDPE film and LLDPE film.

The metal layer 133 is formed of a metal having a high reflection rate to perform as a shield against radiation. The metal having a high reflection rate may be aluminum or SUS, etc. Accordingly, in the present invention, since the vacuum insulator does not need any additional shield against radiation, it can be made easily.

As shown in FIG. 6, the adhesion part of the vacuum insulator according to the first embodiment of the present invention has an upper envelope 131a, 132a, 133a, a lower envelope 131b, 132b, 133b and an adhesion layer 134 therebetween. In other words, the envelopes formed in a single-layer film type of FIG. 5 are contacted with each other in the upward and downward directions in FIG. 6. In addition, the adhesion layer 134 is applied with polyurethane in order to adhere the metal layer 133a of the upper envelope 131a, 132a, 133a, and the metal layer 133b of the lower envelope 131b, 132b, 133b.

The upper envelope 131a, 132a, 133a is composed of a metal layer 133a and a polymer layer 131a, 132a formed on the metal layer 133a. The metal layer 133a is formed of aluminium. In addition, the metal layer 133a may be formed of the other metal except for aluminium. The polymer layer 131a, 132a may be formed by stacking at least one of polymer films. For example, the polymer film may be a polyethylene terephthalate PET film, a low density polyethylene LDPE film, a Linear-Lowdensity polyethylene LLDPE film, etc.

The lower envelope 131b, 132b, 133b is composed of a metal layer 133b and a polymer layer 131b, 132b formed on the metal layer 133b. The metal layer 133b is formed of aluminium. In addition, the metal layer 133a may be formed of the other metal except for aluminium. The polymer layer 131b, 132b may be formed by stacking at least one of polymer films. For example, the polymer film may be a polyethylene terephthalate PET film, a low density polyethylene LDPE film, a Linear-Lowdensity polyethylene LLDPE film, etc.

The adhesion layer 134 is made of polyurethane, and the metal layer 133a of the upper envelope 131a, 132a, 133a and the metal layer 133b of the upper envelope 131b, 132b, 133b are adhered with each other.

Since air infiltration efficiency of the adhesion method of using the junction layer 134 made of polyurethane is lower than that of the conventional method of adhering the LDPE film and the LLDPE film by heat, the envelope having better vacuum maintenance performance than the conventional envelope can be provided.

For example, each permeability for nitrogen and oxygen gas of the polyurethane is as follows.

$$k_{N2}=0.00975\times10^{-13} \text{ cm}^3 \text{ cm/cm}^2\text{sPa}, k_{O2}=0.0645\times10^{-13} \text{ cm}^3 \text{ cm/cm}^2\text{sPa}$$

In addition, each permeability for nitrogen and oxygen gas of the Low density polyethylene LDPE is as follows.

$$k_{N2}=0.73\times10^{-13} \text{ cm}^3 \text{ cm/cm}^2\text{sPa}, k_{O2}=2.2\times10^{-13} \text{ cm}^3 \text{ cm/cm}^2\text{sPa}$$

(Ref. J. Brandrup, E. H. Immergut and E. A. Grulke, Polymer Handbook—Permeability and Diffusion Data $4^{th}$ ed., Wiley, New York, 1999, pp. vi.545-560).

In the vacuum insulator and the envelope of the vacuum insulator according to the first embodiment of the present invention, since a metal layer of an upper envelope and a metal layer of a lower envelope is adhered by polyurethane, air infiltration through an adhesion part of the envelope can be reduced and vacuum maintenance performance can be improved, compared to a conventional case of adhering the envelope by a heat. In addition, according to the present invention, since the envelope comprises a metal layer, air infiltration from the outside through a surface of the envelope can be prevented effectively and the adhesion by urethane can be easy. In addition, according to the present invention, since the metal layer of the upper envelope and the metal layer of the lower envelope by heat between which a film composed of the LDPE and the LLDPE is inserted, are adhered only in an area excluding the certain area along the outlines of the upper envelope and the lower envelope, vacuum maintenance performance of the vacuum insulator can be improved In addition, according to the present invention, since the metal layer having a high reflection rate, performs as a shield against radiation, in the lowest layer of the envelope, any additional shield against radiation is not necessary to be installed and the manufacture process can be easy and convenient.

Figure 7:
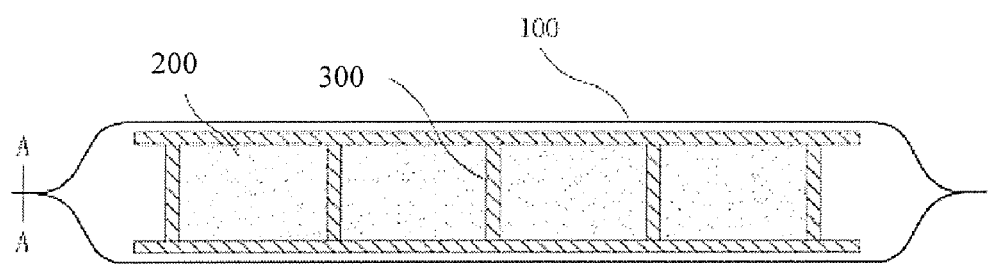
FIG. 7 is a cross sectional view of showing a structure of the vacuum insulator according to the second to the fourth embodiment of the present invention.

FIG. 7 is a cross sectional view of showing a structure of the vacuum insulator according to the second to the fourth embodiment of the present invention.

As shown in FIG. 7, the vacuum insulator is composed of an internal structure 300, a filler 200 and an envelope 100.

The internal structure 300 is preferably designed to have a longest heat conduction passage to minimize heat conduction in order to endure an air pressure. Here, the internal structure 300 may be formed in a multi layer structure having a plural of beams, and may be formed in a simple structure having not the multi layer.

The filler 200 is a material for filling empty spaces of the internal structure 300, and prevents heat conduction by gas in the vacuum insulator. As for the filler 200, there are materials such as silica powder, pearlite powder, glass fiber, wool and aerogel, etc.

The envelope 100 surrounds the internal structure 300 to prevent air infiltration from the outside. Here, the envelope 100 is composed of a film which is capable of keeping a vacuum level for a long time due to its low gas permeability. The envelope 100 has an upper envelope formed of a metal layer and a polymer layer formed on the metal layer to surround an upper surface of the internal structure, and a lower envelope formed of a metal layer and a polymer layer formed on the metal layer to surround a lower surface of the internal structure. Here, the metal layer is formed of copper Cu or aluminium Al, etc. to reduce air infiltration from the outside. In addition, the polymer layer is formed by stacking at least one of polymer films. In addition, the metal layer of the upper envelope and the metal layer of the lower envelope are opposite to each other. In the vacuum insulator according to the present invention, the polymer layer has a structure in which a Polyethylene terephthalate film PET and a Lowdensity polyethylene film LDPE are stacked, and however the insulator is not limited to the structure. The polymer layer may have a structure in which a polymer film such as a LLDPE Linear-Lowdensity polyethylene film is stacked in addition to the Polyethylene terephthalate film PET and a Lowdensity polyethylene film LDPE. Also, the polymer layer 131, 132 may be composed of the other polymer film except for PET film, the LDPE film and LLDPE film. Meanwhile, the upper envelope and the lower envelope are joined at ends of the envelope.

The envelope is adhered at the end of the envelope. The metal layers of the upper envelope and the lower envelope can be adhered by a polyurethane or a heat-adhesion part having a Lowdensity polyethylene LDPE and a Linear-Lowdensity polyethylene LLDPE. However, since the heat-adhesion part composed of the LDPE and the LLDPE has a high air permeability to allow relatively much air to be permeated, it is difficult to keep a vacuum level of the vacuum insulator, and the insulating efficiency can be reduced remarkably. Accordingly, since a metal layer is inserted to the heat-adhesion part, a thickness of the heat-adhesion part by inserting a metal layer can be reduced and air permeation through the heat-adhesion part from the outside can be reduced.

Second Embodiment

Figure 8:
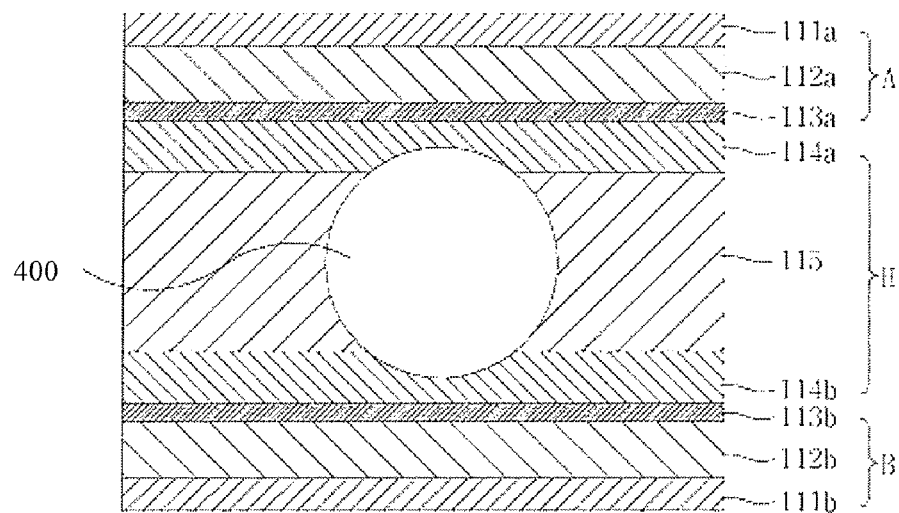
FIG. 8 is a cross sectional view of the end of the envelope of the vacuum insulator according to a second embodiment of the present invention (along A-A in FIG. 7)

FIG. 8 is a cross sectional view of the end of the envelope for the vacuum insulator according to a second embodiment according to the present invention (along A-A in FIG. 7).

As shown in FIG. 8, in the end of the envelope for the vacuum insulator, the upper envelope A and the lower envelope B are adhered by the heat adhesion part H. In the vacuum insulator according to the present invention, since a metal layer 400 is inserted to the heat-adhesion part H to reduce air infiltration through the heat-adhesion part H, a gap between the metal layer 113a of the upper envelope A and the metal layer 113b of the lower envelope B can be decreased. Here, the upper envelope A has a structure in which a Polyethylene terephthalate film PET 111a, a Low density polyethylene film LDPE 112a and a metal layer 113a are stacked. The lower envelope B has a structure in which a Polyethylene terephthalate film PET 111b, a Low density polyethylene film LDPE 112b and a metal layer 113b are stacked.

In addition, the heat adhesion part H is composed of a Lowdensity polyethylene LDPE 114a, 114b and a Linear-Lowdensity polyethylene LLDPE film 115.

More specifically, in the end of the envelope of the vacuum insulator, the metal layer 113a of the upper envelope A and the metal layer 113b of the lower envelope B are adhered by the heat adhesion part H. In addition, since the metal layer 400 is inserted to the heat adhesion part H, between the metal layer 113a of the upper envelope A and the metal layer 113b of the lower envelope B, a thickness of the heat adhesion part H having the LDPE films and the LLDPE film can be decreased, and air infiltration through the heat adhesion part from the outside due to a low air permeability of the metal layer 400 can be effectively prevented. A surface of the metal layer 400 is preferably positioned between a surface of the metal layer 113a and a surface of the metal layer 113b. However, in order to maximally decrease the thickness of the heat adhesion part H between the surface of the metal layer 113a and the surface of the metal layer 113b, a surface of the metal layer 400 is preferably contacted with the surface of the metal layer 113a of the upper envelope A and the surface of the metal layer 113b of the lower envelope B.

As shown in FIG. 8, the metal layer 400 may have a circular section shape. In addition, although not shown in this figure, the metal layer 400 may have a polygonal section shape.

As described above, in the vacuum insulator of the second embodiment according to the present invention, in order to reduce air infiltration through the end of the envelope, since the metal layer 400 is inserted to the heat adhesion part H for adhering the ends of the envelopes, gaps formed of the heat adhesion part H between the metal layer 113a and the metal layer 400 and between the metal layer 113b and the metal layer 400 can be decreased.

Third Embodiment

Figure 9:
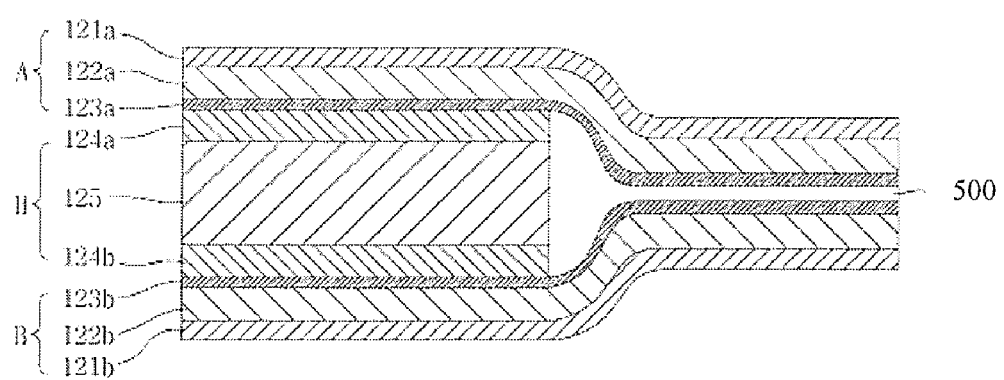
FIG. 9 is a cross sectional view of an end of the envelope of the vacuum insulator according to a third embodiment of the present invention (along A-A in FIG. 7)

FIG. 9 is a cross sectional view of an end of the envelope for the vacuum insulator according to a third embodiment of the present invention (along A-A in FIG. 7).

As shown in FIG. 9, at an area facing the internal structure in the end of the envelope for the vacuum insulator according to the third embodiment of the present invention, the upper envelope A and the lower envelope B are adhered by a heat adhesion part H. At a area in the end of the envelope, the upper envelope A and the lower envelope B are adhered by polyurethane 500. The upper envelope A is a portion where a Polyethylene terephthalate film PET 121a, Low density polyethylene film LDPE 122a and a metal layer 123a are stacked. In addition, the lower envelope B is a portion where a Polyethylene terephthalate film PET 121b, a Low density polyethylene film LDPE 122b and a metal layer 123b are stacked. In addition, the heat adhesion part H is composed of a LDPE Lowdensity polyethylene film 124a, 124b, and Linear-Lowdensity polyethylene film LLDPE 125.

More specifically, at the area facing the internal structure of the end of the envelope, the metal layer 123a of the upper envelope A and the metal layer 123b of the lower envelope B are adhered by the heat adhesion. In addition, at side area opposite of the internal structure in the end of the envelope, the heat adhesion H composed of Low density polyethylene film LDPE 124a, 124b and Linear low density polyethylene LLDPE 125 film is melted to expose the metal layers 123 a 123b, then the metal layers are adhered again by polyurethane 500 with a very thin thickness, having a low air permeability. The heat adhesion H, which is composed of the Low density polyethylene film LDPE 124a, 124b and the Linear low density polyethylene LLDPE 125 of the area opposite of the internal structure in the end of the envelope, may be melted and removed by heat or solvents. Since the LDPE Low density polyethylene film and the LLDPE Linear low density polyethylene are not melted well by the general organic solvents, the LDPE and the LLDPE are melted by heat of more than 120° C. or melted by solvents such as a toluene, xylene, and cyclohexane, etc at about 90° C. Since the polyurethane 500 has lower air infiltration than the adhesion by the heat adhesion part H composed of the LDPE film and the LLDPE film, vacuum maintenance performance can be more remarkable improved. (Permeability of the Polyurethane $k_{N2}=0.00975\times10^{-13}$ cm$^3$ cm/cm$^2$sPa, $k_{O2}=0.0645\times10^{-13}$ cm$^3$ cm/cm$^2$sPa, and Permeability of the Low density polyethylene LDPE $k_{N2}=0.73\times10^{-13}$ cm$^3$ cm/cm$^2$sPa, $k_{O2}=2.2\times10^{-13}$ cm$^3$ cm/cm$^2$sPa) (Ref J. Brandrup, E. H. Immergut and E. A. Grulke, Polymer Handbook-Permeability and Diffusion Data 4$^{th}$ ed., Wiley, New York, 1999, pp. VI.545-560).

As described above, in the vacuum insulator according to the third embodiment of the present invention, in order to reduce air infiltration from the outside through the end of the envelope, the area facing the internal structure in the end of the envelope of the vacuum insulator is adhered by the heat adhesion part H, and the area opposite to the internal structure in the end of the envelope of the vacuum insulator is adhered by the polyurethane 500.

Fourth Embodiment

Figure 10:
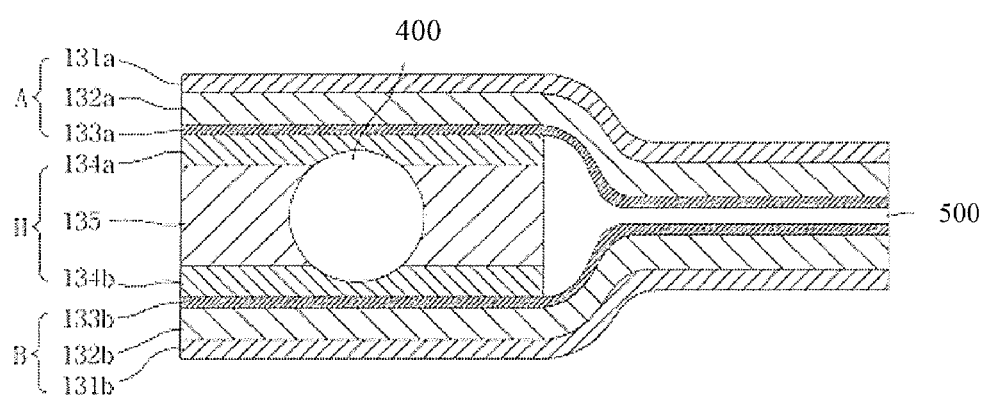
FIG. 10 is a cross sectional view of an end of the envelope of the vacuum insulator according to a fourth embodiment of the present invention (along A-A in FIG. 7).

FIG. 10 is a cross sectional view of an end of the envelope for the vacuum insulator according to a fourth embodiment of the present invention (along A-A in FIG. 7).

As shown in FIG. 10, in the end of the envelope for the vacuum insulator according to the fourth embodiment of the present invention, the upper envelope A and the lower envelope B are adhered by the heat adhesion part at an area facing the internal structure, and the upper envelope A and the lower envelope B are adhered by the polyurethane 500 at a area opposite to the internal structure in the end of the envelope of the vacuum insulator. In addition, in order to reduce air infiltration through the heat adhesion part H, a metal layer 400 is inserted to the heat adhesion part H. The upper envelope A is a portion where a PET Polyethylene terephthalate film 131a, a LDPE Low density polyethylene film 132a, and a metal layer 133a are stacked. The lower envelope B is a portion where a Polyethylene terephthalate film PET 131b, a Low density polyethylene film LDPE 132b, and a metal layer 133b are stacked. In addition, the heat adhesion part H is composed of a Lowdensity polyethylene film LDPE 134a, 134b and a Linear-Lowdensity polyethylene film LLDPE 135.

More specifically, at an area facing the internal structure in the end of the envelope, the metal layer 133a of the upper envelope A and the metal layer 133b of the lower envelope B are adhered by the heat adhesion part H. In addition, the metal layer 400 is inserted into the heat adhesion part H, between the metal layer 133a of the upper envelope A and the metal layer 133b of the lower envelope B. In the atmosphere state, at the area opposite to the internal structure in the end of the envelope, the heat adhesion H composed of Low density polyethylene film LDPE 134a, 134b and Linear low density polyethylene LLDPE 135 film is melted to expose the metal layers 133a 133b, then the metal layers are adhered again by polyurethane 500 with a very thin thickness, having a low air permeability. Accordingly, air infiltration through the surface of the envelope from the outside can be prevented by the metal layer 400 which is located in the middle of the area facing the internal structure of the end of the envelope, and air infiltration through the heat adhesion part H can be effectively prevented by polyurethane 500 and the metal layer 400. A surface of the metal layer 400 is preferably positioned between a surface of the metal layer 133a and a surface of the metal layer 133b. However, in order to maximally decrease the thickness of the heat adhesion part H between the surface of the metal layer 133a and the surface of the metal layer 133b, a surface of the metal layer 400 is preferably contacted with the surface of the metal layer 133a of the upper envelope A and the surface of the metal layer 133b of the lower envelope B.

As shown in FIG. 10, the metal layer 400 may have a circular section shape. In addition, although not shown in this figure, the metal layer 400 may have a polygonal section shape.

As described above, in the vacuum insulator according to the fourth embodiment of the present invention, in order to reduce air infiltration from the outside through the end of the envelope, since the area facing the internal structure in the end of the envelope of the vacuum insulator is adhered by the heat adhesion part H, and the area opposite to the internal structure in the end of the envelope of the vacuum insulator is adhered by the polyurethane 500, and the metal layer 400 is inserted to the heat adhesion par H, a gab formed of the heat adhesion part H between the metal layers 133*a*, 133*b* and the metal layer 400 can be decreased.

Accordingly, since the vacuum insulator according to the present invention has a 10 to 100 times less effective heat conduction coefficient than a conventional insulating material, internal spaces of a refrigerator or a building that must be insulated can be insulated effectively. In addition, with the vacuum insulator according to the present invention, since the thickness of the insulator is reduced, the internal spaces can be used more effectively. In addition, since the vacuum insulator according to the present invention has high vacuum maintenance performance, the vacuum insulating efficiency can be kept for a longer time.

As described above, a technical composition of the present invention is to be understood that one skilled in the art is not to modify a technical idea or an essential feature of the present invention but to take effect as the other concrete embodiments.

Therefore, it is to be understood that embodiments described above are not qualifying but exemplary in all points. Also, the scope of the present invention will be included in the following claims than above detail explanation, and it is to be analyzed that the meaning and scope of the claims and all changes deducted from equivalent arrangements or modifications included within the scope of the present invention.

What is claimed is:

1. A vacuum insulator comprising:
   an internal structure;
   a filler for filling empty spaces of the internal structure; and
   an envelope having an upper envelope composed of a metal layer and a polymer layer formed on the metal layer to surround an upper surface of the internal structure, and a lower envelope composed of a metal layer and a polymer layer formed on the metal layer to surround a lower surface of the internal structure, wherein the metal layer of the upper envelope and the metal layer of the lower envelope are opposite to each other,
   wherein in a certain area along outlines of the upper envelope and the lower envelope, the metal layer of the upper envelope and the metal layer of the lower envelope are adhered by polyurethane, and in an area excluding the certain area, the metal layer of the upper envelope and the metal layer of the lower envelope between which a film composed of a Low density polyethylene LDPE and a LinearLow density polyethylene LLDPE is inserted, are adhered by heat.

2. The vacuum insulator as set forth in claim 1,
   wherein the polymer layer is formed by stacking at least one of polymer films.

3. A vacuum insulator comprising:
   an internal structure;
   a filler for filling empty spaces of the internal structure; and
   an envelope having an upper envelope composed of a metal layer and a polymer layer formed on the metal layer to surround an upper surface of the internal structure, and a lower envelope composed of a metal layer and a polymer layer formed on the metal layer to surround a lower surface of the internal structure, wherein the metal layer of the upper envelope and the metal layer of the lower envelope being opposite to each other,
   wherein at an area facing the internal structure in an end of the envelope, the upper envelope and the lower envelope are adhered by a heat adhesion part, and
   at a area opposite to the internal structure in the end of the envelope, the upper envelope and the lower envelope are adhered by polyurethane.

* * * * *